G. G. BUCKLAND.
BICYCLE FRAME.
APPLICATION FILED AUG. 2, 1913.
1,114,855.
Patented Oct. 27, 1914.
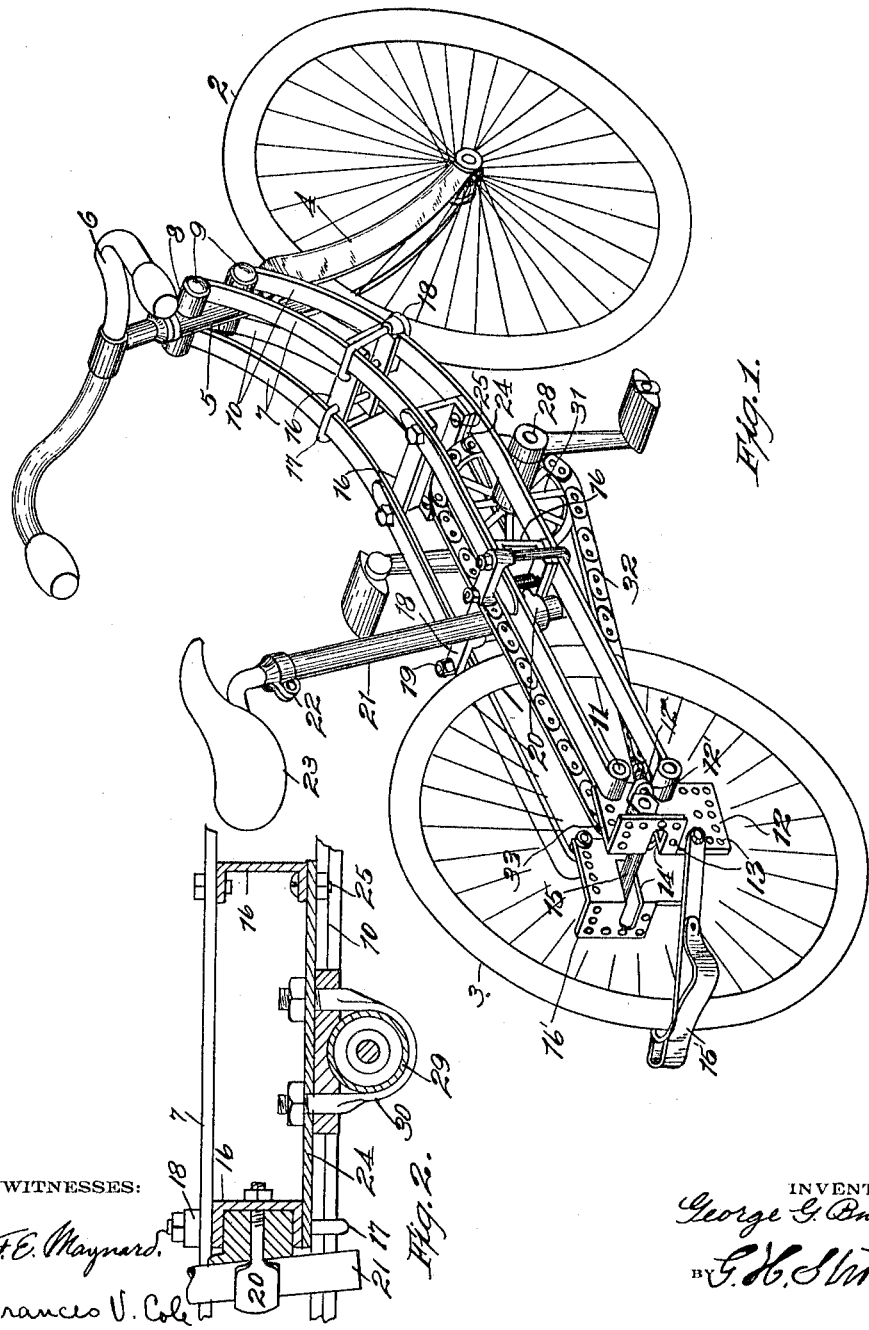
WITNESSES:
F.E. Maynard.
Frances V. Cole.
INVENTOR
George G. Buckland,
BY G. H. Strong.
ATTORNEY

UNITED STATES PATENT OFFICE.

GEORGE G. BUCKLAND, OF SAN FRANCISCO, CALIFORNIA.

BICYCLE-FRAME.

1,114,855.  Specification of Letters Patent.  Patented Oct. 27, 1914.

Application filed August 2, 1913. Serial No. 782,746.

*To all whom it may concern:*

Be it known that I, GEORGE G. BUCKLAND, a citizen of the United States, residing in the city and county of San Francisco and State of California, have invented new and useful Improvements in Bicycle-Frames, of which the following is a specification.

This invention relates to bicycles, and particularly to improvements in bicycle frames.

It is one of the objects of the present invention to provide a substantial, flexible, comparatively inexpensive, and durable frame structure for vehicles of the class consisting of wheels arranged in tandem, such as bicycles, motorcycles, and the like.

It is a particular object of the invention to provide a frame for bicycles, motorcycles, etc., which will eliminate the necessity of extraneous springs for connecting the different elements of the bicycle to the frame; the present frame comprising resilient members capable of sufficient inherent flexibility to afford ample cushioning effect and adapted to be directly connected to the carrying wheels and capable of directly supporting the appurtenances of bicycles, such as the seats or motors.

The invention consists of the parts and the construction and combination of parts as hereinafter more fully described and claimed, having reference to the accompanying drawings, in which—

Figure 1 is a perspective view of the improved bicycle. Fig. 2 is a detail of the hanger.

In its illustrated embodiment the frame is shown as being adapted for manual propulsion, although it is understood that a suitable source of motive power may be mounted directly upon the frame when so desired.

2 represents the front or steering wheel and 3 the driving or rear wheel. The front wheel is pivotally attached to the frame by a suitable form of yoke 4, turnable in the tubular front or head 5, through which the top of the yoke is projected and provided with handle bars 6.

A primary feature of the present invention is the frame structure, which is shown as consisting of longitudinally extending, horizontally spaced leaf or strip springs 7, which may be of suitable form and are here shown as of the laminated type. The forward portions of the leaf springs 7 are curved upwardly and pivotally connected, as at 8, upon suitable trunnions 9 adjacent to, or on the sides of the steering head 5.

There may be and preferably is provided a lower set of horizontally spaced springs 10, of suitable design and proportion, curved upwardly at their forward ends and also pivotally jointed to suitable trunnions 9 on the steering head. The upper and lower sets of springs 7 and 10 are extended rearwardly in substantially parallel vertical and fixed horizontal relation and their respective ends are pivotally mounted upon trunnions 11 which are adjustably secured in rear plates or hangers 12. The plates or hangers 12 are here shown as each provided with a multiplicity of apertures 13 and each is also substantially horizontally slotted, as at 14, to receive the axle 15 of the rear wheel. The rear plates or hangers are provided with outwardly extending angular pieces or ears 16', which are also perforated, as at 13. Upon these ears may be attached such appurtenances as may be desired. In the present instance there is pivotally connected to the rear plates 12 a bracket 15' which may be swung downwardly below the rear wheel to support the bicycle in an upright position.

For the purpose of securing and maintaining the desired position or spacing of the upper springs 7 lateral to each other and the lower springs 10 lateral from each other, and to hold the upper set of springs 7 vertically spaced from the lower springs 10, I provide a suitable form of spacer and binding means. This means comprises transverse pieces 16, which may be of channel iron, disposed transversely between the upper and lower sets of springs 7 and 10, and through which channel pieces 16 may be passed U-bolts or clips 17, which are here shown as straddling the springs 7 and 10. One leg of each of the U-bolts passes through the transverse brace 16 and the outer legs of the U-bolts pass downwardly upon the outside of the springs and the lower ends of the respective U-bolts are tied or joined by a plate or yoke 18, against which may be screwed up locking nuts 19.

Located about intermediately of the longitudinally extending frame-forming springs 7 and 10 there is disposed one of the transverse braces 16, to which may be connected a clip 20 formed to receive and hold a seat post 21, which may be adjusted vertically, with respect to the frame 7—10, and firmly locked in its adjusted position by the clip 20. The seat post 21 may be of suitable form and provided at its upper end with a clamp 22 for binding upon the seat 23 adjustable in the post 21.

The propelling mechanism of whatever type may be employed can be attached to the spring frame 7—10 by any appropriate means, which is here shown as including a transverse plate 24, bolted or otherwise attached to the upper surface of the lower springs 10 by bolts 25. For insuring the relative rigidity of the central portions of the springs at the location of the propelling mechanism the plate 24 may be reinforced and connected to the upper set of springs 7 by a transverse channel section or other suitable brace 16, bolted as at 27.

While it is understood that any suitable type of propelling mechanism may be utilized upon the vehicle, in the present instance I have shown a crank-shaft 28 mounted in a crank-shaft hanger 29, bolted by appropriate means, as the clips 30, to the brace plate 24. Upon the frame shaft is provided the usual sprocket wheel 31 driving through means of a chain 32 a sprocket wheel 33 on the rear wheel 3 of the bicycle.

From the foregoing it will be seen that I have provided for bicycles a frame of suitable construction, the constituent elements of which are resilient members or springs horizontally, vertically and transversely braced and firmly secured; the springs being capable of vertical flexure and having pivotal relation with the front head 5 of the bicycle. The rear hanger plates 12 are mounted upon the axle 15 so that I entirely eliminate all extraneous supplemental springs which are usually employed for connecting the head of the bicycle to the front of the frame and for connecting the driving wheel to the rear of the frame or for connecting or supporting the seat upon the frame, and at the same time I have provided a frame which is substantial and may be easily repaired by the removal or interchanging of the several spring members in the event of injury or breakge thereof.

For adjusting the axle in the plates 12 these are provided with threaded lugs 12' to receive screws 12ª which react against the axle to support it.

Having thus described my invention, what I claim and desire to secure by Letters Patent is—

1. The combination in a bicycle, of two wheels disposed in tandem, connecting means between the front and rear wheels, said means consisting of two pairs of parallel springs pivotally connected to opposite sides of the front steering head, and plates to which the rear ends of the springs are pivotally connected, said plates carrying the rear axle.

2. In a bicycle having a front wheel steering post turnable in a steering head sleeve, springs in pairs pivoted one above the other on opposite sides of the sleeve, and extending in parallel lines, rear plates to which the rear of the springs are pivotally connected, a rear axle adjustably supported by said plates, and means intermediate of the ends rigidly connecting the springs to act as a unit in their elastic movements.

3. A bicycle having a front wheel steering post turnable in a steering head sleeve, parallel springs disposed in pairs and pivotally connected to opposite sides of the steering head, and plates to which the rear ends of the springs are pivoted and in which a rear axle is journaled, said springs having a downward curvature from the head to an approximate level with the rear axle support, and connections to insure a unitary elastic movement.

4. In a bicycle of the character described, downwardly curved parallel springs pivoted upon each side of the steering head and to a rear axle bearing plate, and means interposed between the front and rear of the springs to unite them in a single unitary elastic structure, and a seat post supported thereby and prevented from side rolling movement.

5. In a bicycle of the character described, downwardly curved parallel springs pivoted in pairs upon each side of the steering head and rigidly united at intervals between the front and rear to have a unitary elastic movement, and plates to which the rear ends of the springs are pivoted, said plates being formed to receive supplemental attachments and slotted to adjustably carry a rear wheel axle.

6. In a bicycle, a frame consisting of a plurality of horizontally and vertically spaced, longitudinal spring bars, a steering head to which each of said bars is connected, and spaced angle plates with longitudinal slots for receiving a wheel axle and having a multiplicity of perforations for connecting the adjacent ends of the spring bars to the plates.

7. In a bicycle, a frame consisting of a plurality of horizontally and vertically spaced, longitudinal spring bars, a steering head on its wheel to which each of said bars is connected, spaced angle plates with longitudinal slots for receiving a wheel axle and having a multiplicity of perforations for connecting the adjacent ends of the spring bars to the plates, and means for adjusting the position of the axle in the plates.

8. A bicycle comprising longitudinally, vertically and horizontally spaced spring bars, transverse channel-iron braces connecting the bars, and U-clips embracing the vertically adjacent bars and engaging the braces, to form a structure, the elements of which are united to yield in unison without transverse rocking movement.

In testimony whereof I have hereunto set my hand in the presence of two subscribing witnesses.

GEORGE G. BUCKLAND.

Witnesses:
W. W. HEALEY,
J. H. HERRING.

Copies of this patent may be obtained for five cents each, by addressing the "Commissioner of Patents, Washington, D. C."